US009626572B2

(12) United States Patent
Ishimaru et al.

(10) Patent No.: US 9,626,572 B2
(45) Date of Patent: Apr. 18, 2017

(54) APPARATUS FOR DETECTING BOUNDARY LINE OF VEHICLE LANE AND METHOD THEREOF

(71) Applicants: DENSO CORPORATION, Kariya, Aichi-pref. (JP); NIPPON SOKEN, INC., Nishio, Aichi-pref. (JP)

(72) Inventors: Kazuhisa Ishimaru, Nagoya (JP); Naoki Kawasaki, Kariya (JP); Shunsuke Suzuki, Aichi-ken (JP); Tetsuya Takafuji, Anjo (JP)

(73) Assignees: DENSO CORPORATION, Kariya, Aichi-pref. (JP); NIPPON SOKEN, INC., Nishio, Aichi-pref. (JP)

( * ) Notice: Subject to any disclaimer, the term of this patent is extended or adjusted under 35 U.S.C. 154(b) by 220 days.

(21) Appl. No.: 14/404,224

(22) PCT Filed: May 31, 2013

(86) PCT No.: PCT/JP2013/065206
§ 371 (c)(1),
(2) Date: Nov. 26, 2014

(87) PCT Pub. No.: WO2013/180273
PCT Pub. Date: Dec. 5, 2013

(65) Prior Publication Data
US 2015/0169966 A1    Jun. 18, 2015

(30) Foreign Application Priority Data

Jun. 1, 2012    (JP) ................................ 2012-126154

(51) Int. Cl.
*H04N 7/18*    (2006.01)
*G06K 9/00*    (2006.01)
(Continued)

(52) U.S. Cl.
CPC ............ *G06K 9/00798* (2013.01); *B60R 1/00* (2013.01); *G06T 7/0083* (2013.01); *G08G 1/167* (2013.01);
(Continued)

(58) Field of Classification Search
CPC ....... G06K 9/00798; B60R 1/00; G08G 1/167
(Continued)

(56) References Cited

U.S. PATENT DOCUMENTS 7,808,523 B2 * 10/2010 Nishida ................ G05D 1/0246
348/148
7,948,397 B2 * 5/2011 Nakamura ......... G06K 9/00798
340/435

FOREIGN PATENT DOCUMENTS

JP    2005084959 A    3/2005
JP    2005275691 A    10/2005
(Continued)

OTHER PUBLICATIONS

International Search Report (in Japanese with English Translation) for PCT/JP2013/065206, mailed Aug. 13, 2013; ISA/JP.
(Continued)

*Primary Examiner* — Robert Chevalier
(74) *Attorney, Agent, or Firm* — Harness, Dickey & Pierce, P.L.C.

(57) ABSTRACT

In vehicle-lane boundary line detection, low-luminance values are acquired from areas corresponding to below a tire and directly below a vehicle center based on a road surface image. A snow rut degree is calculated based on a luminance ration between the areas. A probability is calculated from a map based on the calculated snow rut degree. A parameter indicating the degree of snow rut likeness is calculated by a low-pass filtering process. A snow rut determination is made by the calculation result being compared with a predeter-
(Continued)

mined threshold. A final determination of whether or not a snow rut is present is made, with reference to an outside temperature. When determined that a snow rut is present, a determination is made not to perform the detection. When determined that a snow rut is not present, a determination is made to perform the detection.

18 Claims, 6 Drawing Sheets

(51) Int. Cl.
    *G08G 1/16*     (2006.01)
    *G06T 7/00*     (2017.01)
    *B60R 1/00*     (2006.01)

(52) U.S. Cl.
    CPC ............... *G06T 2207/10024* (2013.01); *G06T 2207/30256* (2013.01)

(58) Field of Classification Search
    USPC ........ 348/148, 143, 149, 154, 155; 386/200, 386/224, 223, 226, 227
    See application file for complete search history.

(56) References Cited

FOREIGN PATENT DOCUMENTS

| JP | 2005276041 A | 10/2005 |
|---|---|---|
| JP | 2009271908 A | 11/2009 |
| JP | 2010164521 A | 7/2010 |

OTHER PUBLICATIONS

Written Opinion for PCT/JP2013/065206, mailed Aug. 13, 2013; ISA/JP.
International Preliminary Report on Patentability (in Japanese with English Translation) for PCT/JP2013/065206, issued Dec. 2, 2014; ISA/JP.

\* cited by examiner

IMAGE OF LUMINANCE ON ROAD SURFACE HAVING SNOW RUT

APPARATUS FOR DETECTING BOUNDARY LINE OF VEHICLE LANE AND METHOD THEREOF

CROSS REFERENCE TO RELATED APPLICATIONS

This application is a U.S. National Phase Application under 35 U.S.C. 371 of International Application No. PCT/JP2013/065206 filed on May 31, 2013 and published in Japanese as WO 2013/180273 A1 on Dec. 5, 2013. This application is based on and claims the benefit of priority from Japanese Patent Application No. 2012-126154 filed Jun. 1, 2012. The entire disclosures of all of the above applications are incorporated herein by reference.

BACKGROUND

Technical Field

The present invention relates, in particular, to an apparatus that detects a vehicle-lane boundary line, such as a white line, based on a road surface image capturing a road surface ahead of a vehicle, and a method thereof.

Background Art

A vehicle-lane boundary line detection apparatus has been proposed in the past that detects a boundary line of a vehicle lane (hereinafter, a vehicle-lane boundary line), such as a white line, based on a road surface image capturing a road surface ahead of a vehicle. An apparatus such as this detects the vehicle-lane boundary line from a road surface image. Therefore, when the road surface is covered by snow, the white line or the like on the road surface does not appear in the road surface image. The vehicle-lane boundary line cannot be appropriately detected.

Therefore, as described in PTL 1, an apparatus is proposed that determines a degree of variation in the disposition of a detected vehicle-lane boundary line (lane marker). When the degree of variation is a predetermined threshold or higher, the apparatus determines that an inhibiting factor that reduces recognition accuracy of the vehicle-lane boundary line is present. This apparatus is configured to determine that an inhibiting factor that reduces recognition accuracy of the vehicle-lane boundary line is present when variations in the position of the vehicle-lane boundary line occur due to snow.

PTL 1 JP-A-2009-271908

When a rut is formed on a snow-covered road, the boundary portion between the snow and the road surface may be linear (for example, refer to FIG. 4, described hereafter). In the above-described apparatus in PTL 1, when a boundary line is formed linearly in this way, variations do not occur in the disposition of the detected lane marker. Therefore, an inhibiting factor is not determined as being present. An erroneous detection that the lane marker is correct may be made.

SUMMARY

Therefore, it is desired that an apparatus and a method for detecting a boundary line of a vehicle lane be provided, the apparatus and the method being capable of reducing erroneous detection of a vehicle-lane boundary line on a snow-covered road on which ruts are formed.

To solve the above-described problem, in a preferred example, an apparatus that detects a boundary line of a vehicle lane is provided. The apparatus includes an image acquiring means, a detecting means, a calculating means, and a determining means.

The image acquiring means acquires a road surface image capturing a road surface in the periphery of a vehicle. The detecting means detects a vehicle-lane boundary line (boundary line of a vehicle lane) by image processing from the road surface image acquired by the image acquiring means. The calculating means calculates a parameter indicating the degree of whiteness of an area corresponding to below the vehicle center in comparison with an area corresponding to below the tire of the vehicle in the road surface image.

The determining means determines whether or not to perform any process designated among the detection by the detecting means, output of the detected vehicle-lane boundary line, and predetermined control using the detected vehicle-lane boundary line, based on the calculated parameter.

The parameter that is calculated in the apparatus configured as described above is a parameter of which the value increases as the likelihood of the road surface being a snow-covered road on which a rut is formed increases. On a snow-covered road on which a rut is formed, the risk of erroneous detection of the vehicle-lane boundary line due to the rut increases. However, by determining whether or not to perform detection of the vehicle-lane boundary line, output of information on the detected vehicle-lane boundary line, or control using the vehicle-lane boundary line based on the parameter, erroneous detection of the vehicle-lane boundary line can be reduced. Erroneous vehicle control being performed as a result of the erroneously detected vehicle-lane boundary line can be suppressed.

In addition, as another preferred example, a program is provided to provide the functions of the above-described apparatus. The program is stored in a recording medium so as to be readable by a processor (central processing unit (CPU)). The program is a program for enabling a computer to actualize first to fourth functions.

The first function is acquiring a road surface image capturing a road surface in the periphery of a vehicle. The second function is detecting a vehicle-lane boundary line by image processing from the road surface image. The third function is calculating a parameter indicating the degree of whiteness of an area corresponding to below the vehicle center in comparison with an area corresponding to below the tire of the vehicle in the road surface image.

The fourth function is determining whether or not to perform a process, regarding any process among the detection by the first function, output of the detected vehicle-lane boundary line, and predetermined control using the detected vehicle-lane boundary line, based on the parameter calculated by the third function.

A computer than is controlled by a program such as that described above can achieve workings and effects similar to those of the vehicle-lane boundary line detection apparatus recited in claim 1.

The above-described program is composed of sequenced rows of commands suitable for processing by a computer. The program is may be stored in a read-only memory (ROM) or a random access memory (RAM) that serves as a non-transitory computer readable medium and is assembled in the computer. The program may be used so as to be loaded onto the computer from the ROM or the RAM. Alternatively, the program may be loaded onto the computer from various types of recording media or over a communication line.

As the recording media that serves as a non-transitory computer readable medium, optical disks such as a compact disc read-only memory (CD-ROM) or a digital versatile disc read-only memory (DVD-ROM), magnetic disks, semiconductor memories, and the like can be provided.

As still another preferred example, a method for detecting a boundary line of a vehicle lane that achieves functions equivalent to those of the above-described apparatus is also provided.

DESCRIPTION OF EMBODIMENTS

Various examples of a vehicle-lane boundary line detection apparatus of the present invention will hereinafter be described with reference to the drawings.

First Example

First, a vehicle-lane boundary line detection apparatus of a first example will be described with reference to FIG. 1 to FIG. 8.

Figure 1:
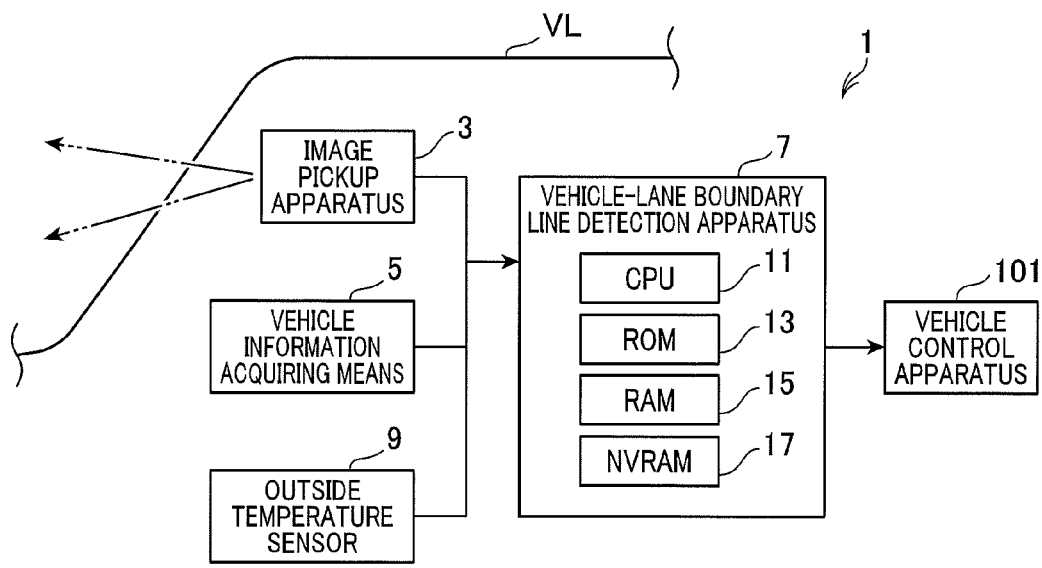
FIG. 1 is a block diagram of a configuration of a vehicle-lane boundary line recognition system that functionally includes a vehicle-lane boundary line detection apparatus of the present invention.

FIG. 1 describes an overview of a configuration of a vehicle-lane boundary line recognition system 1. The vehicle-lane boundary line recognition system 1 is a system which is used so as to be mounted in a vehicle VL, such as an automobile. As shown in FIG. 1, the vehicle-lane boundary line recognition system 1 includes an image pickup apparatus 3, a vehicle information acquiring means 5, a vehicle-lane boundary line detection apparatus (in other words, an apparatus and a method for detecting a boundary line (boundary or edge on a road surface) of a vehicle lane) 7, an outside temperature sensor 9, and a vehicle control apparatus 101. In other words, the vehicle-lane boundary line detection apparatus 7 of the first example is implemented as an element of the vehicle-lane boundary line recognition system 1. In the description hereafter, the vehicle VL refers to the vehicle in which the present system is mounted.

The image pickup apparatus 3 is mounted, for example, on the center front side of the vehicle. The image pickup apparatus 3 is a camera system that captures images at a predetermined time interval ($\frac{1}{15}$ [sec] in the present example). The images capture the periphery of the vehicle VL, and in particular, the road surface ahead of the vehicle (the images may hereinafter be referred to as simply road surface images). For example, a known charge-coupled device (CCD) image sensor or complementary metal-oxide-semiconductor (CMOS) sensor may be used as the image pickup apparatus 3. The image pickup apparatus 3 outputs the captured road surface image to the vehicle-lane boundary line detection apparatus 7.

The vehicle information acquiring means 5 is connected to sensors that detect the vehicle speed, yaw rate, and the like. The vehicle information acquiring means 5 acquires output signals from the sensors. The vehicle information acquiring means 5 then outputs the acquired information to the vehicle control apparatus 101 via the vehicle-lane boundary line detection apparatus 7.

The vehicle-lane boundary line detection apparatus 7 performs image processing on the road surface image captured by the image pickup apparatus 3. The vehicle-lane boundary line detection apparatus 7 then detects a boundary line of a vehicle lane (vehicle-lane boundary line), such as a white line.

The vehicle-lane boundary line detection apparatus 7 is configured as a computer system that includes a central processing unit (CPU) (processor) 11, a read-only memory (ROM) 13 which serves as a non-transitory computer readable medium, a random access memory (RAM) 15, a non-volatile RAM (NVRAM) 17, and the like. The ROM 13 stores therein programs to be run by the CPU 11 and the like. The RAM 15 is used as a work area when the CPU 11 runs a program. The NVRAM 17 serves as a non-volatile memory, such as a flash memory or an electrically erasable programmable ROM (EEPROM) in which data can be electrically rewritten. The vehicle-lane boundary line detection apparatus 7 performs a predetermined process by running a program.

Figure 2:
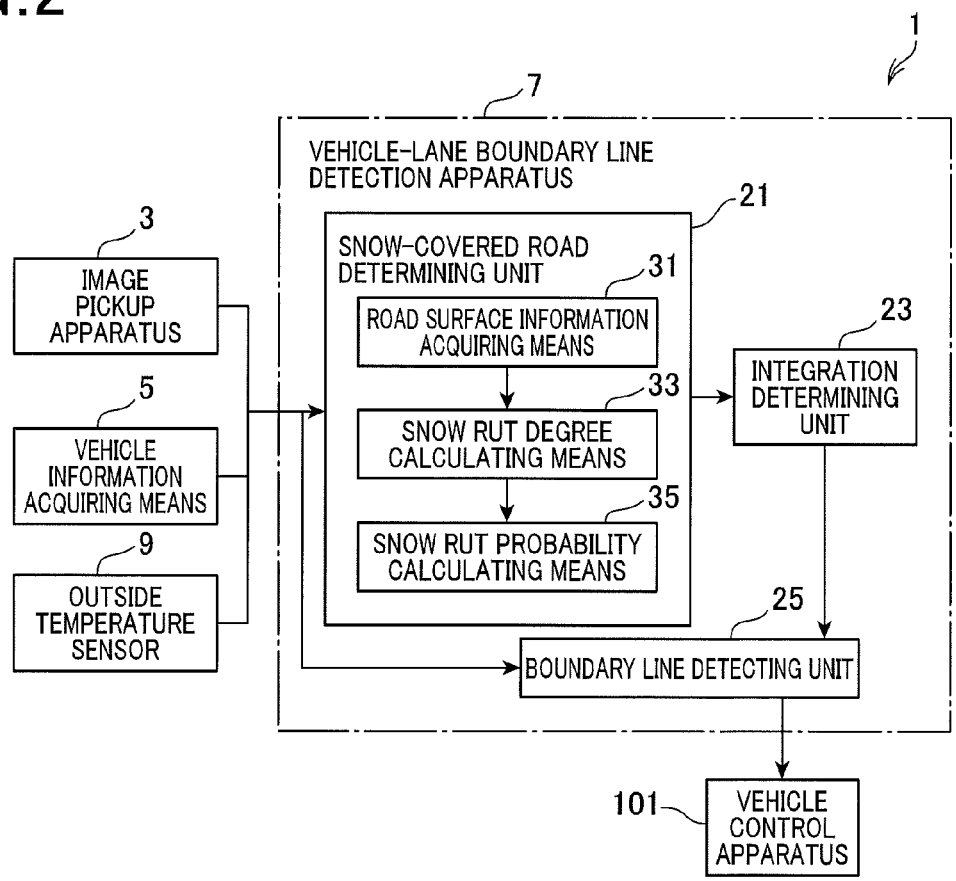
FIG. 2 is a functional block diagram showing the functions of the vehicle-lane boundary line detection apparatus in a first example.

As shown in FIG. 2, the vehicle-lane boundary line detection apparatus 7, configured as described above, functions as a snow-covered road determining unit 21, an integrated determining unit 23, and a boundary line detecting unit 25.

The snow-covered road determining unit 21 includes a road surface information acquiring means 31, a snow rut degree calculating means 33, and a snow rut probability calculating means 35.

The road surface information acquiring means 31 acquires the road surface image from the image pickup apparatus 3. The road surface information acquiring means 31 then acquires luminance information of an area corresponding to below the center of the vehicle VL and areas corresponding to below the left and right tires of the vehicle VL, from the road surface image. The areas are areas that extend further towards the front side of the vehicle VL than the actual positions below the vehicle center and below the tires, so as to be elongated along the cruising direction of the vehicle VL. A specific method for acquiring the luminance information will be described with reference to FIG. 3.

A left sample line 43, a center sample line 45, and a right sample line 47 are set in a road surface image 41. The left sample line 43 is a line corresponding to an area 43a that extends from the position of the left tire along the cruising direction of the vehicle VL. The right sample line 47 is a line corresponding to an area 47a that extends from the position of the right tire along the cruising direction of the vehicle VL. In addition, the center sample line 45 is a line corresponding to an area 45a that extends from the vehicle center (such as a center position between the left and right tires) along the cruising direction of the vehicle VL.

In addition, a plurality of scan lines 49 are set in the road surface image 41. The scan lines 49 extend in the left/right direction and are set so as to be aligned in the up/down direction. A point at which a scan line 49 and a sample line intersect is set as a sample point 51. The number of sample points 51 is determined based on the number of scan lines 49. However, the number of scan lines 49 and the number of sample points 51 are not particularly limited. In addition, the distance between scan lines 49 is also not particularly limited. However, the distance between scan lines 49 may be set so as to become wider as the scan lines 49 become close to the vehicle VL and become narrower as the scan lines 49 become far from the vehicle VL, so as to be similar to the spacing of the actual distance of the corresponding road surface.

Then, the road surface information acquiring means 31 acquires the luminance at each sample point 51. For example, when each pixel in the road surface image is composed of a combination of the respective luminance of the colors red (R), green (G), and blue (B), the luminance of any single color, determined in advance, may be acquired. Alternatively, the luminance after conversion to greyscale may be acquired. In addition, the luminance to be used may be changed depending on road conditions, time, and the like. In the snow rut degree calculating means 33, described hereafter, snow on the road surface and the road surface (such as asphalt) are differentiated based on luminance. Therefore, the luminance to be used is preferably selected so that the difference in luminance between the snow and the road surface is clearly evident.

The road surface information acquiring means 31 then extracts a ten-percentile value of the luminance values from each group 53a, 53b, and 53c of sample points 51. The groups 53a, 53b, and 53c of sample points 51 respectively correspond to the left sample line 43, the center sample line 45, and the right sample line 47. The ten percentile values are values of luminance information corresponding to the left and right tires and below the vehicle center.

The snow rut degree calculating means 33 calculates a snow rut degree based on the road surface image. The snow rut degree is an indicator of a snow rut being formed on the road surface.

Figure 4:
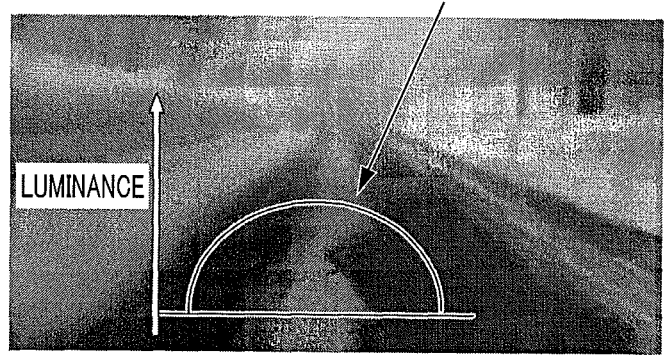
FIG. 4 is an example of a road surface image showing a road surface on which snow ruts are formed.

As shown in FIG. 4, in the rut section, the snow is compressed and melted by the tire running over the snow. The road surface tends to become exposed. On the other hand, in sections other than the rut, the snow tends to remain in greater volume than in the rut section. The exposed road surface is composed of asphalt or the like and appears black. Sections in which snow is present appears white because of the snow. Therefore, a parameter that indicates the degree of whiteness of the section between ruts (an area corresponding to below the vehicle center) in comparison with the rut section (an area corresponding to below the tire) can be used as the indicator of a snow rut being formed.

In the present example, the above-described parameter is calculated using the luminance information acquired by the road surface information acquiring means 31. On a road surface on which the snow rut is formed, luminance is low in the rut section over which the tire passes. Luminance is high below the vehicle center because of the presence of snow. The snow rut degree calculating means 33 calculates the snow rut degree based on the above-described rationale. Specifically, a luminance ratio of below the tire and below the vehicle center is outputted as the snow rut degree. A calculation formula for the snow rut degree is as follows.

Snow rut degree (luminance ratio)=(ten-percentile value of luminance directly below vehicle)/max (ten-percentile value of luminance below left tire, ten-percentile value of luminance below right tire)

Figure 5:
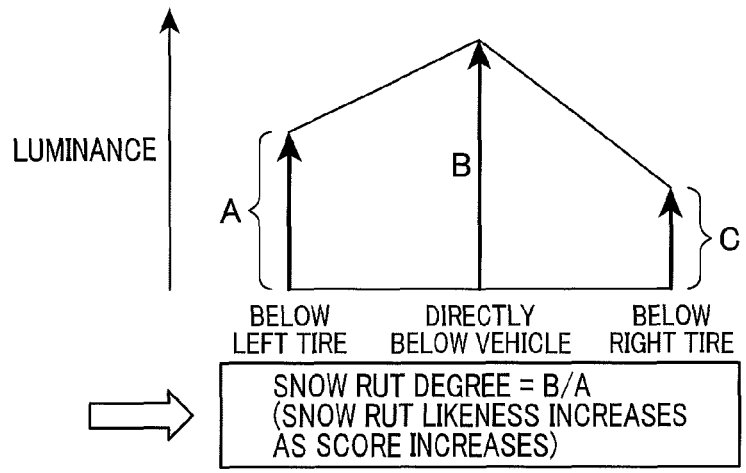
FIG. 5 is a diagram for describing a method for calculating a snow rut degree.

As shown in FIG. 5, the formula above indicates that the snow rut frequency is calculated based on a ratio of the greater of luminance A below the left tire and luminance C below the right tire, to luminance B directly below the vehicle center.

Figure 3:
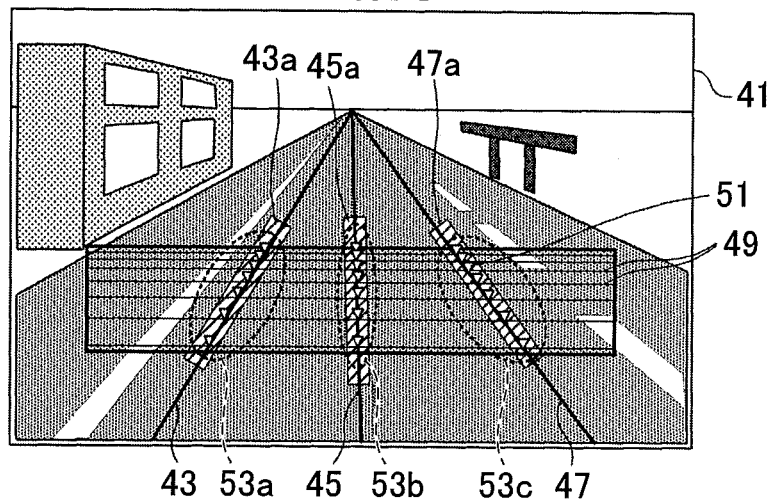
FIG. 3 is a diagram for describing a method for acquiring luminance information using a schematic road surface image.

As shown in FIG. 3, the sample points 51 are continuously disposed with space therebetween from a position close to the vehicle VL to a relatively far position, at a plurality of positions with an appropriate distance therebetween along the vehicle cruising direction. Therefore, the ten percentile value of each group 53a to 53c of sample points 51 becomes the luminance value of a section having low luminance when an overall predetermined area along the cruising direction is viewed at each sample line.

Therefore, when the snow rut degree becomes high in the above-described formula, a low-luminance section is present below the left and right tires. In addition, the luminance is substantially high below the vehicle center. In other words, regarding below the left and right tires, a section in which the road surface is exposed to at least a certain extent is present below both left and right tires, between a position near the vehicle and a position far from the vehicle. Regarding below the vehicle center, snow is continuously present without discontinuation from the position near the vehicle VL to the relatively far position.

In this way, an instance in which the snow rut degree is high is limited to when snow is continuously present below the center of the vehicle. However, regarding the rut section, even an instance in which snow may remain on a portion thereof is permitted. On the road surface on which a snow rut is formed, snow may remain in the rut section. However, there are few instances in which snow is not present directly below the vehicle center. Therefore, whether or not the road is a snow-covered road on which a snow rut is formed can be appropriately determined using the above-described formula.

The snow rut degree is calculated as described above. The snow rut degree is a parameter that indicates the degree of whiteness of an area corresponding to below the vehicle center compared to an area corresponding to below the tire, acquired based on a single road surface image.

The snow rut probability calculating means 35 calculates, as a parameter indicating the degree of snow rut likeness, a parameter in which fluctuation is suppressed compared to the above-described snow rut degree. The snow rut probability calculating means 35 calculates the parameter using snow rut degree history and a map. Specifically, the snow rut probability calculating means 35 calculates a probability (snow rut probability) corresponding to the snow rut degree using a map such as that shown in FIG. 6. The probability is an instantaneous probability based only on the acquired road surface image.

The calculated snow rut probabilities are continuously outputted to the integrated determining unit 23.

The integrated determining unit 23 inputs the snow rut probabilities from the snow rut probability calculating means 35 and performs a low-pass filtering process using the following expression.

$$\text{Output}(t)=\alpha A(t-1)+(1-\alpha)A(t)$$

In this formula, "Output(t)" represents an output parameter at time t, "A(t)" represents the instantaneous probability at time t, "A(t−1)" represents the output parameter (Output (t−1)) at time t−1, "α" is a value that is less than 1. Stability increases as α becomes closer to 1.

An example of a graph showing the changes over time in the parameter for snow rut likeness on which the low-pass filtering process has been performed as described above is shown in FIG. 7.

Next, the integrated determining unit 23 determines whether or not a snow rut is present by comparing the parameter for snow rut likeness with a predetermined threshold. To apply hysteresis to the determination, the integrated determining unit 23 uses the history of the parameter for snow rut likeness and two thresholds with a difference in values. In other words, the integrated determining unit 23 determines that a snow rut is present when the parameter exceeds a threshold that is set to be relatively high. The integrated determining unit 23 retains the determination until the parameter falls below a threshold that is set to be relatively low. On the other hand, the integrated determining unit 23 determines that a snow rut is not present when the parameter falls below the threshold that is set to be low. The integrated determining unit 23 retains the determination until the parameter exceeds the threshold that is set to be high.

In addition, the integrated determining unit 23 checks the outside temperature based on the output from the outside temperature sensor 9. The integrated determining unit 23 makes a final determination that a snow rut is present when the outside temperature is lower than a predetermined temperature that is set as a temperature in which snow is able to be present and the snow rut is determined to be present by the above-described process. When the outside temperature is determined to be the predetermined temperature or higher, the integrated determining unit 23 determines that a snow rut is not present regardless of the determination result based on the road surface image.

The boundary line detecting unit 25 detects the vehicle-lane boundary line, such as a white line, based on the road surface image. The specific method for detecting the vehicle-lane boundary line is not particularly limited. A known method can be used. For example, an edge point that is a point at which the luminance value changes as a result of paint or a road stud is extracted from the road surface image. The vehicle-lane boundary line can be detected based on a plurality of extracted edge points.

Information on the vehicle-lane boundary line detected by the boundary line detecting unit 25 is outputted to the vehicle control apparatus 101. In the vehicle control apparatus 10, the information on the vehicle-lane boundary line is used in combination with behavior information of the vehicle VL, such as the cruising direction, speed, and yaw rate of the vehicle VL to predict whether or not the vehicle VL will deviate from the vehicle-lane boundary line. In addition, the information on the vehicle-lane boundary line is used as a piece of information used in automatic steering angle control.

The above-described boundary line detecting unit 25 does not perform detection of the vehicle-lane boundary line when the integrated determining unit 23 has determined that a snow rut is present. A reason for this is that the accuracy of vehicle-lane boundary line detection tends to decrease when a snow rut is present.

Instead of detection of the vehicle-lane boundary line not being performed, a configuration is possible in which detection of the vehicle-lane boundary line is performed but the information thereof is not outputted to the vehicle control apparatus 101. Alternatively, while the information on the vehicle-lane boundary line is being outputted to the vehicle control apparatus 101, a signal indicating low detection accuracy may be outputted to the vehicle control apparatus 101 at the same time. The vehicle control apparatus 101 may be configured so as not to perform the above-described vehicle control when this signal is inputted is received.

[Processes Performed by Vehicle-Lane Boundary Line Detection Apparatus]

Hereafter, a boundary line detection process performed by the vehicle-lane boundary line detection apparatus 7 will be described with reference to FIG. 8.

When the power of the overall vehicle-lane boundary line recognition system 1 is turned ON based on an ON-operation of an accessory switch of the vehicle VL, the boundary line detection process is started. Even when the accessory switch is turned OFF, the above-described process is repeatedly performed at a certain interval until power is cut.

Figure 8:
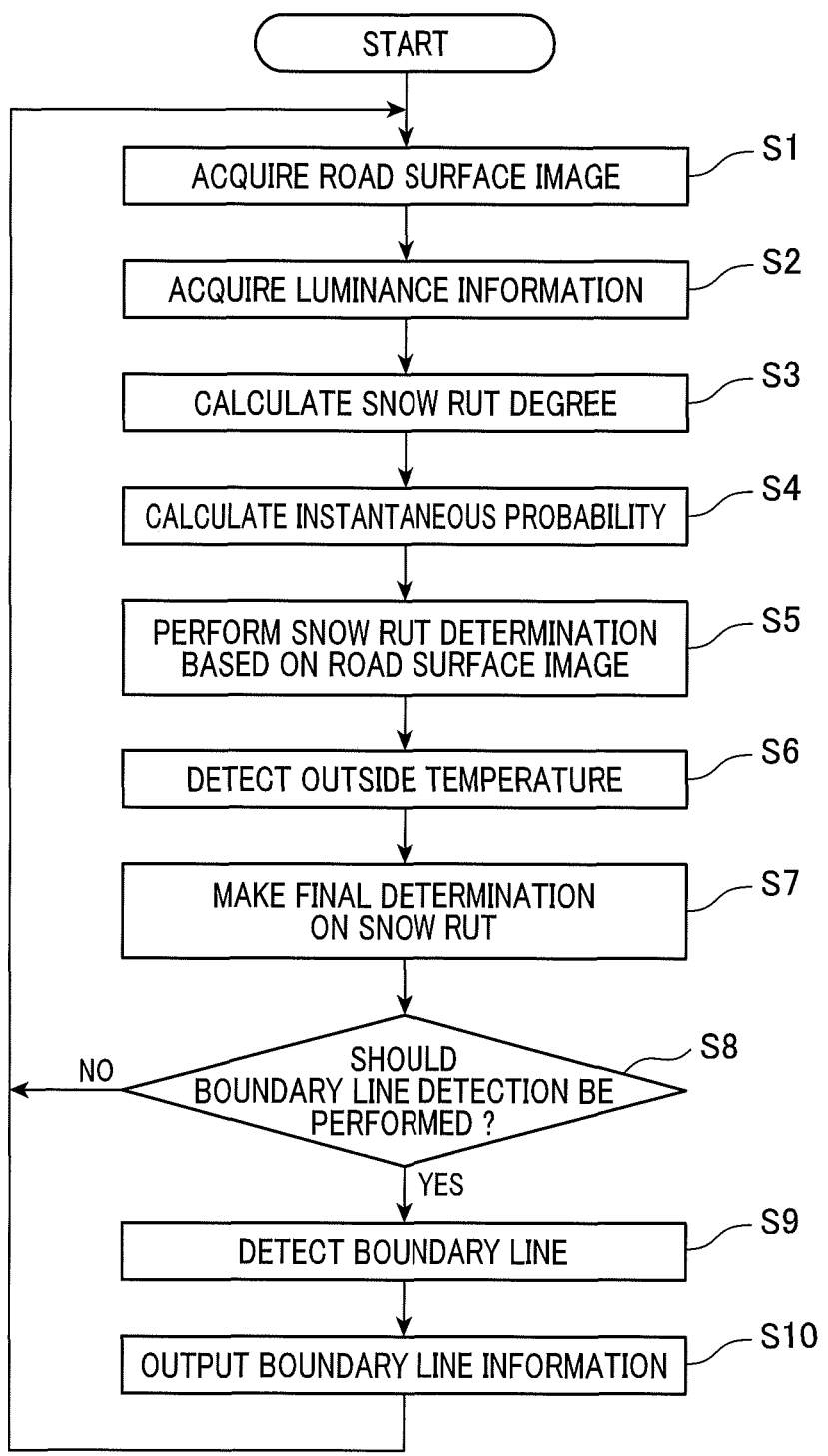
FIG. 8 is a flowchart of the processing procedure for a boundary line detecting process in the first example.

In the boundary line detection process, first, data of the road surface image is acquired from the image pickup apparatus 3 (Step S1 in FIG. 8).

Next, the luminance information based on the road surface image acquired at S1 is acquired (Step S2). This process is performed by the road surface information acquiring means 31. Here, as described above, as the luminance information, the ten percentile value of the luminance values is acquired from each group 53a, 53b, and 53c of sample points 51 below the left tire, below the right tire, and below the vehicle center based on the road surface image.

Next, the snow rut degree calculating means 33 calculates the snow rut degree using the above-described method, based on the luminance information acquired at Step S2 (Step S3).

Figure 6:
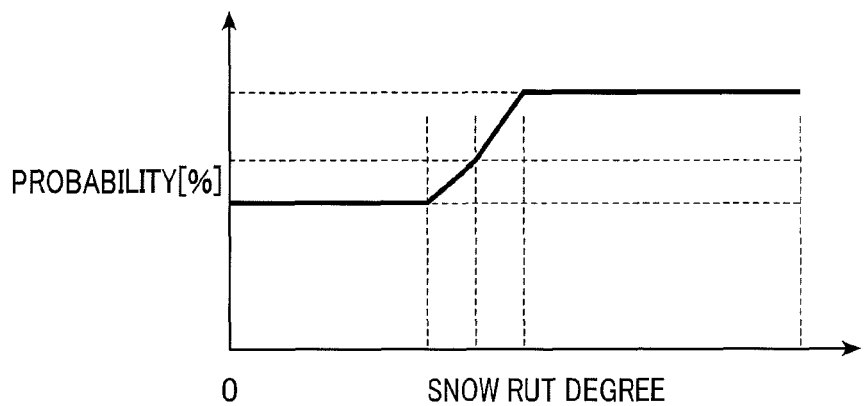
FIG. 6 is an example of a map for calculating a probability based on the snow rut degree.
Figure 7:
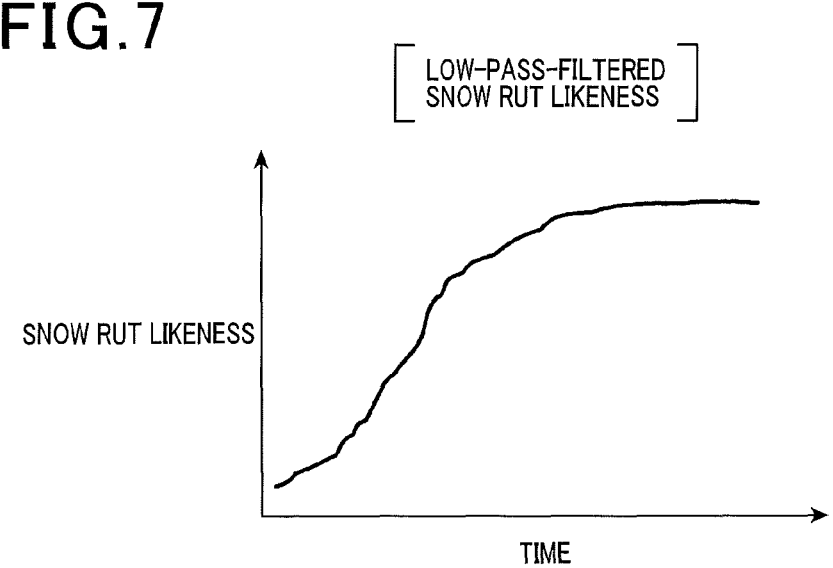
FIG. 7 is a graph showing the changes over time in snow rut likeness on which low-pass filtering has been performed.

Next, the snow rut probability calculating means 35 calculates the probability (instantaneous probability) using the map in FIG. 6, based on the snow rut degree calculated at Step S3 (Step S4).

The process at subsequent Steps S5 to S8 is performed by the integrated determining unit 23. First, the integrated determining unit 23 calculates the parameter indicating the degree of snow rut likeness by performing the low-pass filtering process as described above. The integrated determining unit 23 compares the calculation result with a predetermined threshold and performs snow rut determination (Step S5). Next, the integrated determining unit 23 acquires the outside temperature from the outside temperature sensor 9 (Step S6). The integrated determining unit 23 makes a final determination of whether or not the road surface is a snow-covered road on which a snow rut is formed with reference to the outside temperature (Step S7).

The process at subsequent Steps S8 to S10 is performed by the boundary line detecting unit 25. First, the boundary line detecting unit 25 determines whether or not to perform detection of the vehicle-lane boundary line based on the result at Step S7 (Step S8). When determined that a snow rut is present at Step S7, the boundary line detecting unit 25 determines that the vehicle-lane boundary line detection is not performed (NO at Step S8). The process returns to Step S1 without boundary line detection being performed. On the other hand, when determined that a snow rut is not present at Step S7, the boundary line detecting unit 25 determines that the vehicle-lane boundary line detection should be performed (YES at Step S8). In other words, at Step S8, the likelihood of a negative determination increases as the snow rut degree calculated at Step S3 increases.

Subsequently, the boundary line detecting unit 25 performs boundary line detection (Step S9). The boundary line detecting unit 25 outputs information on the detected vehicle-lane boundary line to the vehicle control apparatus 101 (Step S10). After Step S10, the process returns to Step S1.

As described above, the vehicle-lane boundary line recognition system 1 of the present example is capable of appropriately determining whether or not the road surface on which the vehicle VL is traveling is a snow-covered road on which a snow rut is formed. When determined that the road surface is a snow-covered road on which a snow rut is formed, the vehicle-lane boundary line detection (Step S9) is not performed. Therefore, the risk of erroneous detection of a vehicle-lane boundary line due to the presence of a snow rut can be reduced. As a result, erroneous vehicle control by the vehicle control apparatus 101 can be suppressed.

Similar effects can also be achieved when information on the detected vehicle-lane boundary line is not outputted to the vehicle control apparatus 101 when the road surface is a snow-covered road on which a snow rut is formed, or when a signal indicating low detection accuracy is inputted by the vehicle control apparatus 101 and vehicle control is not performed.

In addition, the vehicle-lane boundary line recognition system 1 of the present example compares the higher of the luminance extracted from the areas corresponding to below the left and right tires with the luminance directly below the vehicle center, when calculating the snow rut degree. Therefore, the snow rut can be detected only when the probability of a snow rut is high. Detection of the vehicle-lane boundary line is not stopped with unnecessary frequency. Detection can be stably performed.

In the above-described example, the process at Step S1 in FIG. 8 is an example of an image acquiring means. The process at Step S9 is an example of a detecting means. The process at Steps S3 and S4 is an example of a calculating means. The process at Steps S5 to S8 is an example of a determining means.

Second Example

A vehicle-lane boundary line recognition apparatus of a second example will be described with reference to FIG. 9 and FIG. 10.

A vehicle-lane boundary line recognition system 61 of the second example has a configuration that is substantially the same as that of the vehicle-lane boundary line recognition system 1 of the first example. However, the functions thereof differ from those of the first example. Therefore, in the second example, elements achieving functions that are the same or similar to those in the first example are given the same reference numbers. Descriptions of sections that are similar to those in the first example are omitted. The modified functions and processes are described below.

Figure 9:
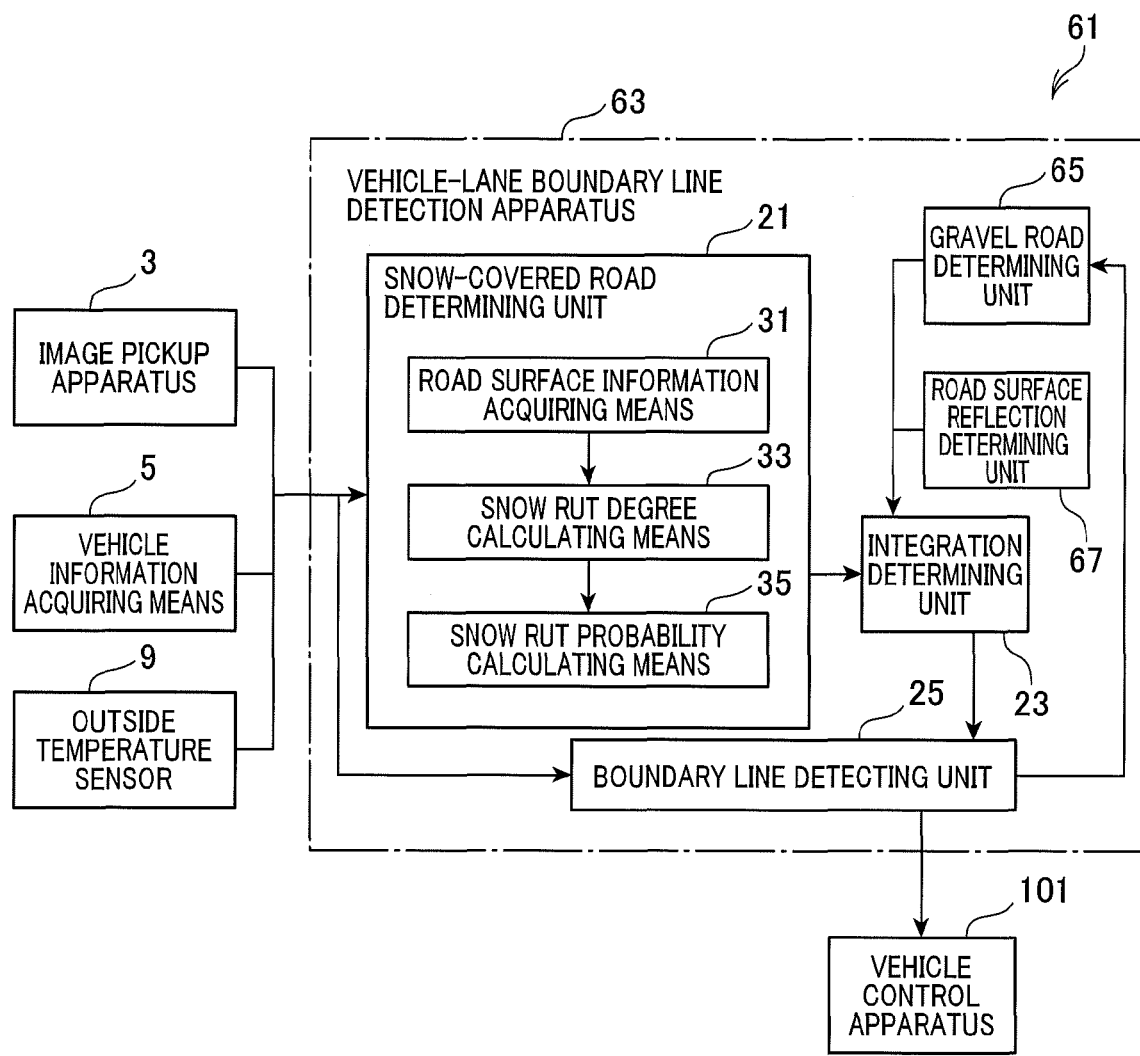
FIG. 9 is a functional block diagram showing the functions of the vehicle-lane boundary line detection apparatus in a second example.

In the vehicle-lane boundary line recognition system 61 of the present example, as shown in FIG. 9, a vehicle-lane boundary line detection apparatus 63 functions as a gravel road detecting unit 65 and a road surface reflection detecting unit 67, in addition to the functions of the vehicle-lane boundary line detection apparatus 7 of the first example.

The gravel road detecting unit 65 detects a parameter indicating the probability of a road surface being a gravel road when a large number of edge points, which are intermediate data from the boundary line detecting unit 25, appear and a phenomenon occurs in which the slanting and lateral position amount of a vehicle lane boundary candidate in relation to the own vehicle significantly change. The parameter is calculated from this amount of change.

The road surface reflection determining unit 67 calculates the probability of the presence of a reflecting section, such as a water puddle, on the road surface. When a water puddle or the like is present, a section having extremely high luminance intermittently occurs. Therefore, the road surface reflection determining unit 67 calculates a parameter indicating the probability of the presence of a reflecting section using the frequency of high-luminance detection, variations in the position thereof, and the like.

The probabilities outputted by the gravel road determining unit 65, the road surface reflection determining unit 67, and the snow-covered road determining unit 21 are all probabilities indicating that the detection accuracy of the vehicle-lane boundary line detected by the boundary line detecting section 25 has decreased. The integrated determining unit 23 integrates these probabilities, thereby determining the decrease in accuracy of the vehicle-lane boundary line detection with high accuracy. The method of integration is not particularly limited. However, performing Bayesian estimation can be considered.

[Processes Performed by Vehicle-Lane Boundary Line Detection Apparatus]

A boundary line detecting process performed by the vehicle-lane boundary line detection apparatus 63 will be described below with reference to FIG. 10. This process is also repeatedly performed at a certain interval. Processes that are the same as those of the boundary line detecting process in FIG. 8 are given the same reference numbers. Descriptions thereof are omitted.

In the present process, after the snow-covered road determining unit 21 calculates the instantaneous probability at Step S4, the parameter indicating the probability of a gravel road likeness is calculated (Step S21). The calculation result is outputted to the integrated determining unit 23. This process is performed by the gravel road determining unit 65. Next, the parameter indicating the probability of the presence of a reflecting section on the road surface is calculated (Step S22). The calculation result is outputted to the integrated determining unit 23. This process is performed by the road surface reflection determining unit 67.

Next, an integrating process is performed (Step S23). Here, the parameters for probability calculated at Steps S4, S21, and S22 are integrated. A parameter indicating the probability of a decrease in detection accuracy of the vehicle-lane boundary line related to the road surface image acquired at Step S1 is calculated.

Next, whether or not the detection accuracy of the vehicle-lane boundary line has decreased is determined (Step S24). Here, whether or not to perform boundary line detection is determined by comparing the probability parameter calculated (integrated) at Step S23 and a predetermined threshold. To apply hysteresis, the probability parameter history and two thresholds with a difference in values are used.

In other words, when the parameter exceeds a threshold that is set to be relatively high, a determination is made that "the detection accuracy of the vehicle-lane boundary line has decreased". The determination is retained until the parameter falls below a threshold that is set to be relatively low. On the other hand, when the parameter falls below the threshold that is set to be low, a determination is made that "the detection accuracy of the vehicle-lane boundary line has not decreased". The determination is retained until the parameter exceeds the threshold that is set to be high.

Next, whether or not to perform detection of the vehicle lane boundary is determined from the result at Step S24 (Step S25). When determined that the detection accuracy of the vehicle-lane boundary line has decreased at Step S24, a determination is made that the vehicle-lane boundary line detection is not performed (NO at Step S25). The process returns to Step S1 without the boundary line detection being performed. On the other hand, when determined that the detection accuracy of the vehicle-lane boundary line has not decreased at Step S24, a determination is made that the vehicle-lane boundary line detection is performed (YES at Step S25). At Step S25, the likelihood of a negative determination increases as the snow rut degree calculated at Step S3 increases. The process subsequently proceeds to Step S9.

The vehicle-lane boundary line recognition system 61 of the present example can determine whether or not noise that reduces boundary line detection accuracy is present on the road surface, taking into consideration a plurality of elements, such as the probability of the road surface being a gravel road and the probability of the presence of a reflecting surface on the road surface, in addition to the probability of the road surface being a snow-covered road on which a rut is formed. Therefore, a road surface on which noise is present can be recognized with high accuracy. A process for detecting the vehicle-lane boundary line on a road surface on which noise is present can be performed. The risk of erroneous detection of a vehicle-lane boundary line can be reduced.

Figure 10:
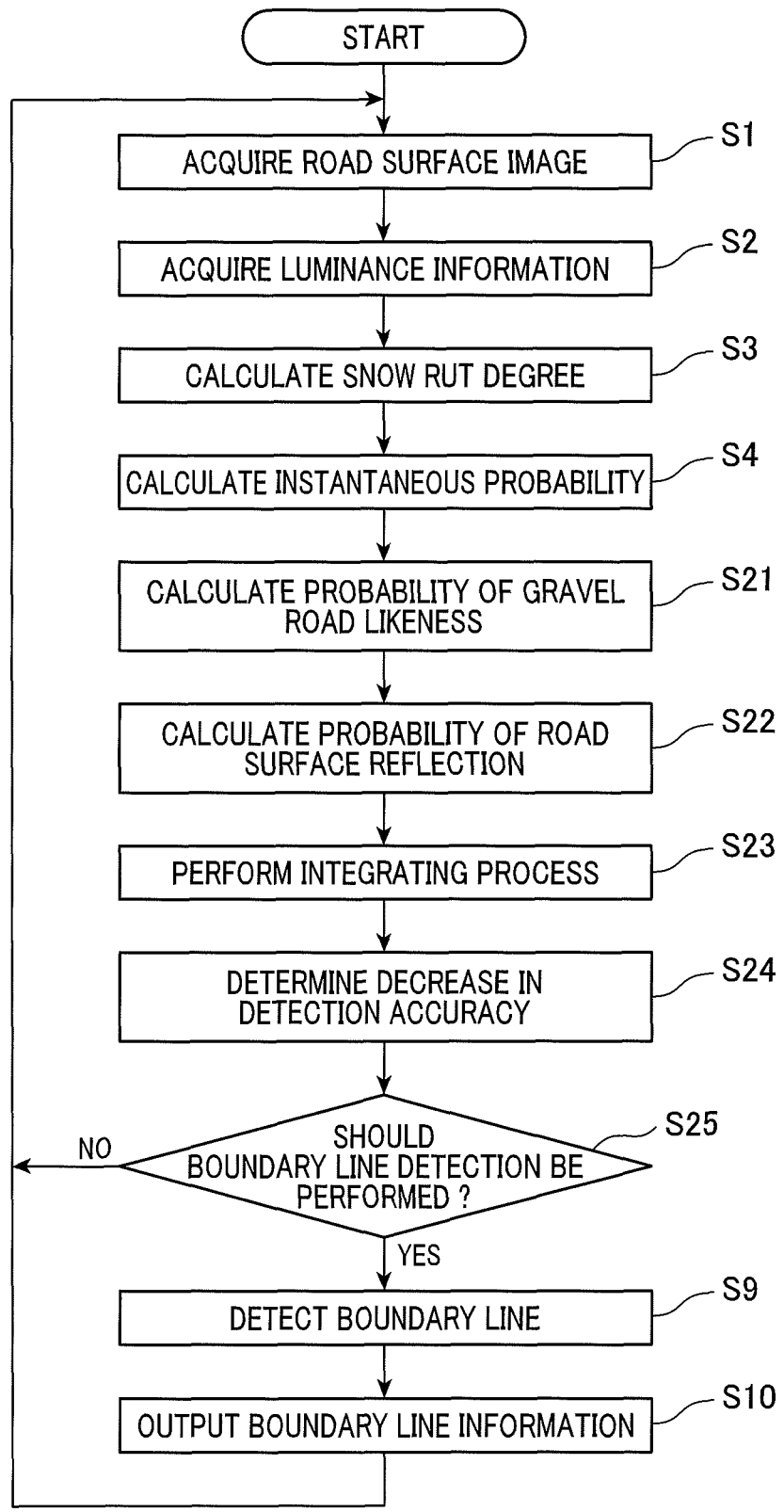
FIG. 10 is a flowchart of the processing procedure for the boundary line detecting process in the second example.

In the present example, the process at Steps S23 to S25 in FIG. 10 is an example of the determining means.

Variation Example

The examples of the present invention are described above. However, the present invention is not limited in any way by the above-described examples. Various aspects are possible as long as the aspects belong within the technical scope of the present invention.

For example, in each of the above-described examples, a configuration is described in which, when the snow rut degree is calculated, the higher of the luminance extracted from the areas corresponding to below the left and right tires is compared with the luminance directly below the vehicle center. However, the lower of the luminance below the left and right tires may be compared. In this instance, detection of a snow rut become easier. Stopping of detection of the vehicle-lane boundary line due to snow ruts can be performed more easily. The accuracy of avoidance of erroneous detection can be increased. In addition, an average value of the luminance on the left and right sides may be used.

In addition, in each of the above-described examples, a configuration is described in which the snow rut degree is calculated based on luminance in the road surface image. However, an image feature quantity other than luminance may be used as long as the image feature quantity is that which can indicate the degree of snow likeness from the road surface image. For example, a configuration can be considered in which, instead of luminance, a parameter calculated using a conversion formula and color information, such as hue and color difference, is used as the image feature quantity. In the conversion formula, a higher value is obtained as the color becomes closer to the color of snow.

In addition, in each of the above-described examples, a configuration is described in which the ten percentile values from the groups 53a to 53c of sample points 51 are used. However, a value other than the ten percentile value may be extracted and used. To achieve a configuration as described above, in which, as a condition for increasing the snow rut degree, the continued presence of snow directly below the vehicle is highly required and, regarding the rut section, even an instance in which snow remains in a portion thereof is allowed, use of a value that is a 30 percentile value or lower as reference may be considered. In addition, to remove noise, use of a value that is a five percentile value or higher may be considered.

In addition, rather than using the percentile value, an average value of each group or the like may be used as the luminance information. In this instance, changes over time in the luminance value can be suppressed.

In addition, in each of the above-described examples, a configuration is described in which the image pickup apparatus 3 captures a road surface image ahead of the vehicle. Each process is performed based on the road surface image. However, an image pickup apparatus may be set under the vehicle or near the tires. The processes may be performed based on the road surface image captured by this image pickup apparatus.

In addition, in the above-described examples, a configuration is described in which luminance is acquired by the sample points 51 being disposed in a plurality of positions that are spaced along the vehicle cruising direction, as shown in FIG. 3. However, luminance may be acquired at a single location each, below the vehicle center and below the left and right tires (or below either of the left and right tires). In this instance, processing load on the vehicle-lane boundary line detection apparatus can be reduced.

REFERENCE SIGNS LIST 1 vehicle-lane boundary line recognition system
3 image pickup apparatus
5 vehicle information acquiring means
7 vehicle-lane boundary line detection apparatus
9 outside temperature sensor
21 snow-covered road determining unit
23 integrated determining unit
25 boundary line detecting unit
31 road surface information acquiring means
33 snow rut degree calculating means
35 snow rut probability calculating means
41 road surface image
43 left sample line
45 center sample line
47 right sample line
49 scan line
51 sample point
53a to 53c group
61 vehicle-lane boundary line recognition system
63 vehicle-lane boundary line detection apparatus
65 gravel road determining unit
67 road surface reflection determining unit
101 vehicle control apparatus

What is claimed is:

1. An apparatus that detects a boundary line of a vehicle lane, the apparatus comprising:
  image acquiring means for acquiring a road surface image capturing a road surface in the periphery of a vehicle;
  detecting means for detecting a vehicle-lane boundary line by image processing from the road surface image acquired by the image acquiring means;
  calculating means for calculating a parameter indicating the degree of whiteness of an area corresponding to below the vehicle center in comparison with an area corresponding to below the tire of the vehicle in the road surface image acquired by the image acquiring means; and determining means for determining whether or not to perform any process designated among the detection by the detecting means, output of the detected vehicle-lane boundary line, and predetermined control using the detected vehicle-lane boundary line, based on at least the parameter calculated by the calculating means.

2. The apparatus according to claim 1, wherein:
the determining means is set so that the likelihood of a negative determination increases as the value of the parameter increases.

3. The apparatus according to claim 1, wherein:
the calculating means calculates the parameter by acquiring image feature quantities of the area corresponding to below the vehicle center and the area corresponding to below the tire in the road surface image, and comparing the image feature quantity of the area corresponding to below the vehicle center and the image feature quantity of the area below the tire.

4. The apparatus according to claim 3, wherein:
the image feature quantity is luminance in the image.

5. The apparatus according to claim 3, wherein:
the area corresponding to below the vehicle center and the area corresponding to below the tire in the road surface image are areas that are elongated along a cruising direction of the vehicle; and
the calculating means acquires the image feature quantity at a plurality of positions that are spaced along the cruising direction of the vehicle in each area, and performs the comparison using an image feature quantity extracted based on a predetermined reference from among the plurality of acquired image feature quantities.

6. The apparatus according to claim 1, wherein:
the determining means determines that the process should not be performed when the value of the parameter exceeds a predetermined threshold.

7. A non-transitory computer readable medium comprising instructions for detection of a vehicle-lane boundary line on a road surface, the instructions enabling a CPU to operate based on the instructions, the instructions comprising the steps of:
acquiring a road surface image capturing a road surface in the periphery of a vehicle;
detecting a vehicle-lane boundary line by image processing from the road surface image acquired by the acquiring step;
calculating a parameter indicating the degree of whiteness of an area corresponding to below the vehicle center in comparison with an area corresponding to below the tire of the vehicle in the road surface image acquired by the acquiring step; and
determining whether or not to perform any process designated among the detection by the acquiring step, output of the detected vehicle-lane boundary line, and predetermined control using the detected vehicle-lane boundary line, based on the parameter calculated by the calculating step.

8. A method for detecting a boundary line of a vehicle lane, the method comprising the steps of:
acquiring a road surface image capturing a road surface in the periphery of a vehicle;
detecting a vehicle-lane boundary line by image processing from the acquired road surface image;
calculating a parameter indicating the degree of whiteness of an area corresponding to below the vehicle center in comparison with an area corresponding to below the tire of the vehicle in the acquired road surface image; and
determining whether or not to perform a process, regarding any process among the detection, output of the detected vehicle-lane boundary line, and predetermined control using the detected vehicle-lane boundary line, based on at least the calculated parameter.

9. The method according to claim 8, wherein:
the step of determining is set so that the likelihood of a negative determination increases as the value of the parameter increases.

10. The method according to claim 9, wherein:
the step of calculating calculates the parameter by acquiring image feature quantities of the area corresponding to below the vehicle center and the area corresponding to below the tire in the road surface image, and comparing the image feature quantity of the area corresponding to below the vehicle center and the image feature quantity of the area below the tire.

11. The method according to claim 10, wherein:
the image feature quantity is luminance in the image.

12. The method according to claim 11, wherein:
the area corresponding to below the vehicle center and the area corresponding to below the tire in the road surface image are areas that are elongated along a cruising direction of the vehicle; and
the step of calculating acquires the image feature quantity at a plurality of positions that are spaced along the cruising direction of the vehicle in each area, and performs the comparison using an image feature quantity extracted based on a predetermined reference from among the plurality of acquired image feature quantities.

13. The method according to claim 12, wherein:
the determining means determines that the process is not performed when the value of the parameter exceeds a predetermined threshold.

14. The apparatus according to claim 2, wherein:
the calculating means calculates the parameter by acquiring image feature quantities of the area corresponding to below the vehicle center and the area corresponding to below the tire in the road surface image, and comparing the image feature quantity of the area corresponding to below the vehicle center and the image feature quantity of the area below the tire.

15. The apparatus according to claim 4, wherein:
the area corresponding to below the vehicle center and the area corresponding to below the tire in the road surface image are areas that are elongated along a cruising direction of the vehicle; and
the calculating means acquires the image feature quantity at a plurality of positions that are spaced along the cruising direction of the vehicle in each area, and performs the comparison using an image feature quantity extracted based on a predetermined reference from among the plurality of acquired image feature quantities.

16. The apparatus according to claim 2, wherein:
the determining means determines that the process should not be performed when the value of the parameter exceeds a predetermined threshold.

17. The apparatus according to claim 3, wherein:
the determining means determines that the process should not be performed when the value of the parameter exceeds a predetermined threshold.

18. The apparatus according to claim 4, wherein:
the determining means determines that the process should not be performed when the value of the parameter exceeds a predetermined threshold.

\* \* \* \* \*